W. LEWIS.
APPARATUS FOR MEASURING BELTS UNDER TENSION.
APPLICATION FILED APR. 13, 1910.

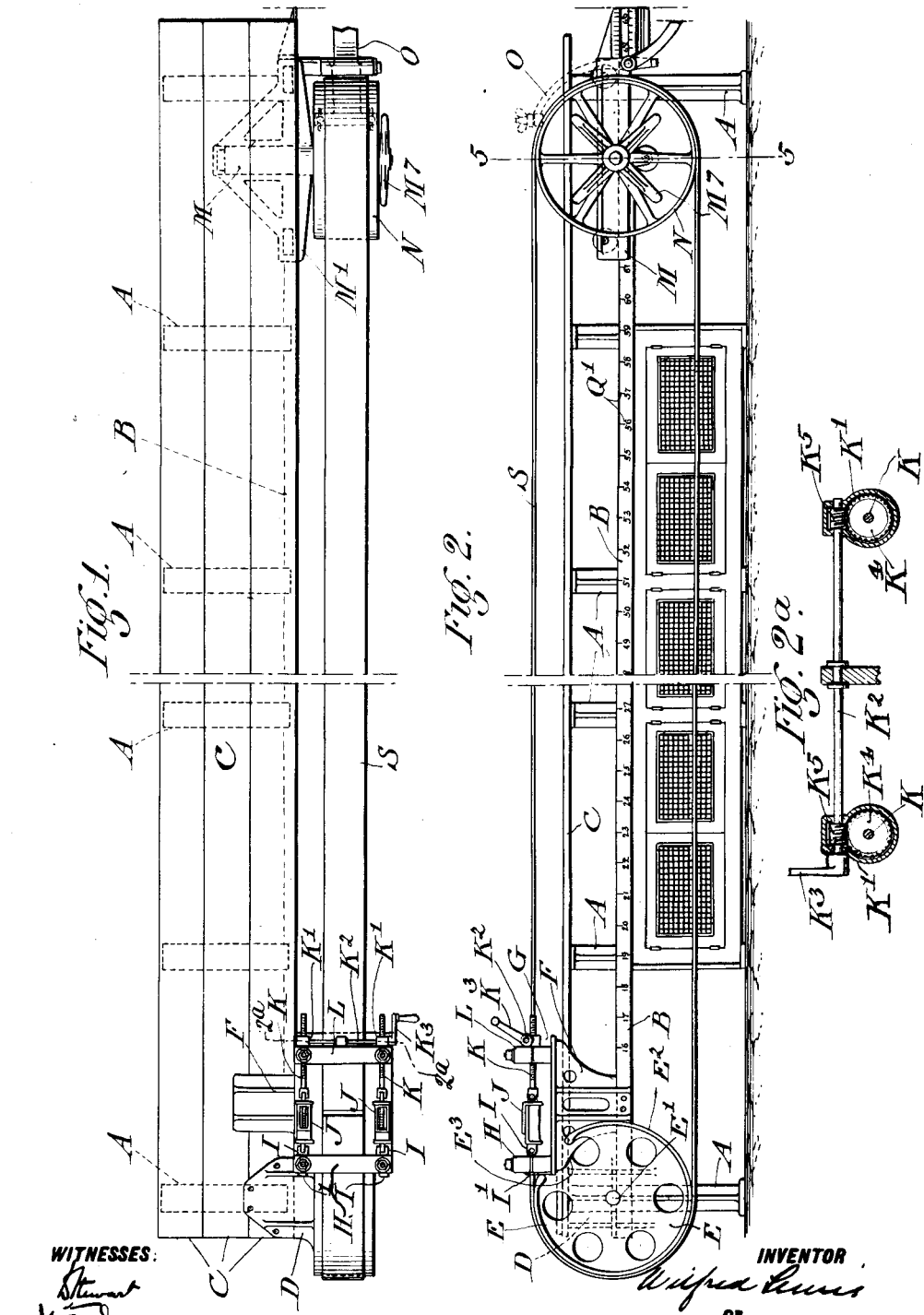
W. LEWIS.
APPARATUS FOR MEASURING BELTS UNDER TENSION.
APPLICATION FILED APR. 13, 1910.
1,066,826. Patented July 8, 1913.
3 SHEETS—SHEET 1.

1,066,826.

Patented July 8, 1913.

3 SHEETS—SHEET 2.

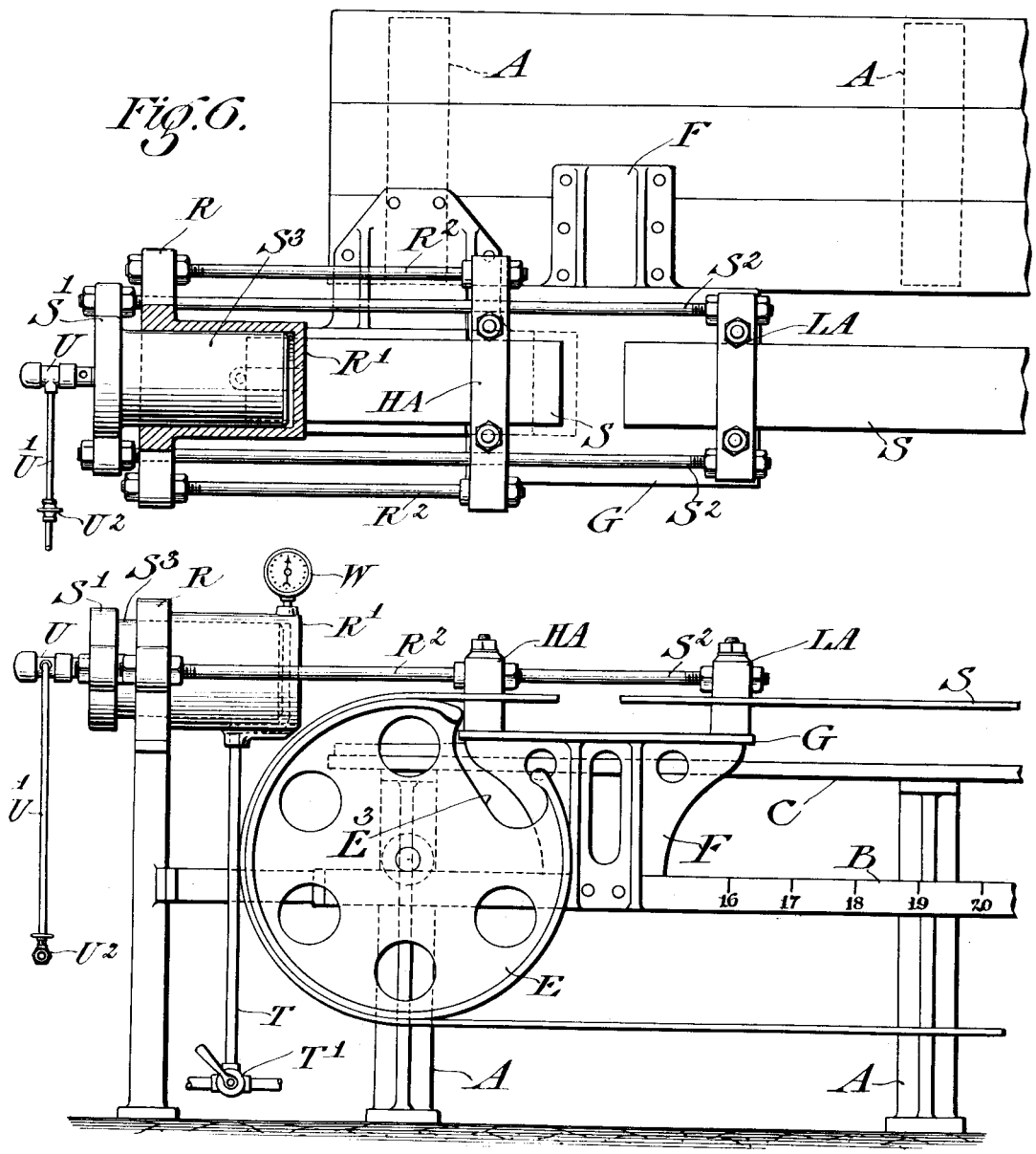

UNITED STATES PATENT OFFICE.

WILFRED LEWIS, OF PHILADELPHIA, PENNSYLVANIA, ASSIGNOR, BY MESNE ASSIGNMENTS, TO THE TABOR MANUFACTURING COMPANY, OF PHILADELPHIA, PENNSYLVANIA, A CORPORATION OF PENNSYLVANIA.

APPARATUS FOR MEASURING BELTS UNDER TENSION.

1,066,826.   Specification of Letters Patent.   Patented July 8, 1913.

Application filed April 13, 1910. Serial No. 555,175.

*To all whom it may concern:*

Be it known that I, WILFRED LEWIS, a citizen of the United States of America, residing in the city and county of Philadelphia, in the State of Pennsylvania, have invented a certain new and useful Improvement in Apparatus for Measuring Belts Under Tension, of which the following is a true and exact description, reference being had to the accompanying drawings, which form a part thereof.

My present invention relates to apparatus for measuring belts preparatory to marking and cutting them in proper lengths for use.

It is a matter of common knowledge that ordinary belts formed of leather, rubber, hemp, etc., are more or less elastic and stretch under tension. In order to have a belt uniting two pulleys under the proper operating tension, it is necessary therefore, that the belt in its unstretched condition should be appreciably shorter than the length of an inelastic belt surrounding the pulleys with the desired amount of sag. It is also well known to those skilled in the art that in service, belts of the character referred to, permanently, though slowly, elongate under the conditions of operation. In consequence, it is usually necessary to shorten a belt from time to time during its effective life, because of the steady, though relatively slow, permanent elongation of the belt material produced by the operation of the belt under tension.

The object of the present invention is the provision of simple and effective apparatus by which belts may be quickly and easily measured while subjected to any desired tension.

A further object of the invention is the provision of an apparatus for the purpose specified in such form that belts varying greatly in length may be measured thereby.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described one of the forms in which my invention may be embodied.

Figure 3:
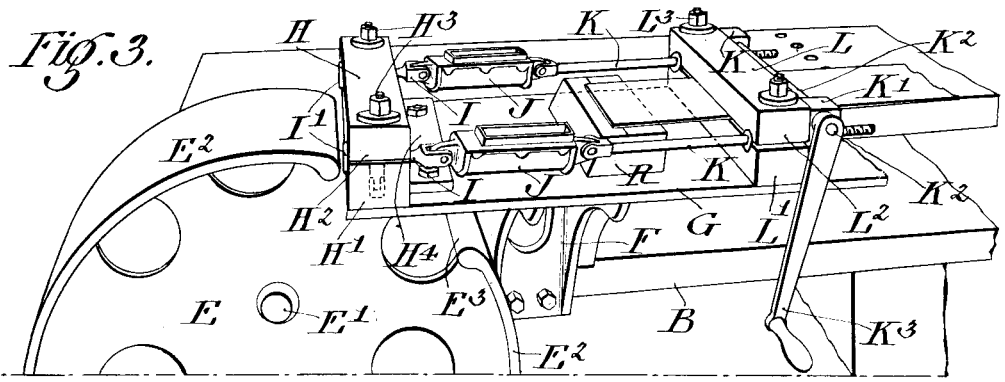
Figure 4:
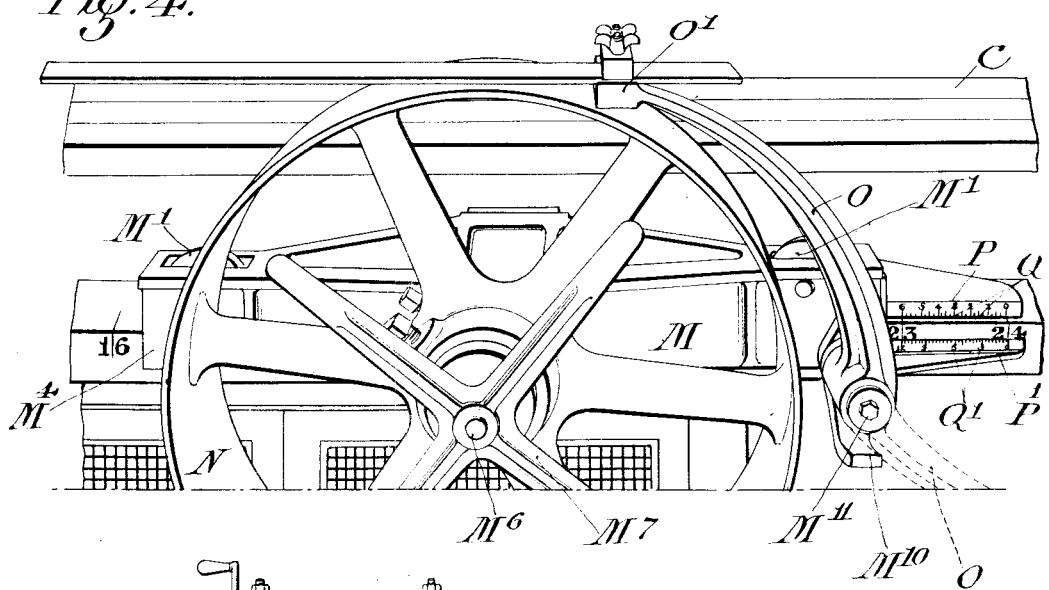
Figure 5:
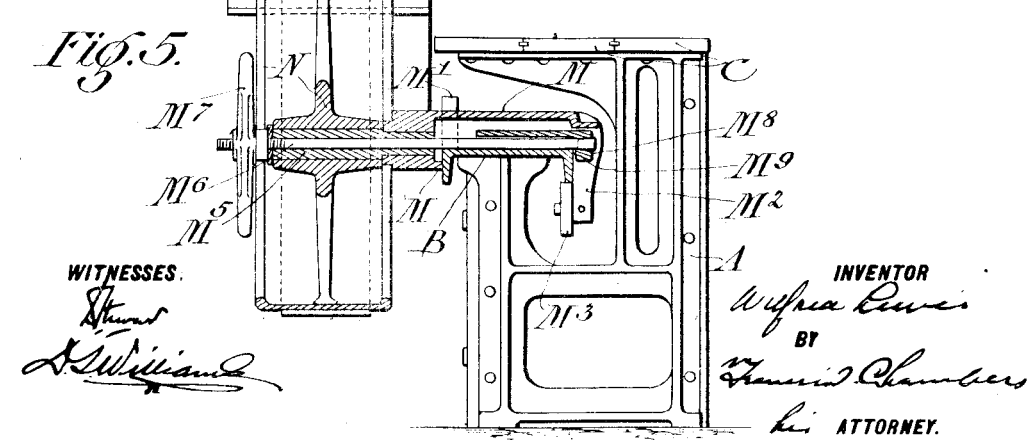

Of the drawings, Figure 1 is a plan view of the complete machine. Fig. 2 is a side elevation of the apparatus shown in Fig. 1. Fig. $2^a$ is a view, partly in section, on the line $2^a$—$2^a$ of Fig. 1. Figs. 3 and 4 are perspective views on a larger scale than Figs. 1 and 2, each showing a different portion of the apparatus shown in Figs. 1 and 2 from that shown by the other. Fig. 5 is a section on the line 5—5 of Fig. 2, and Fig. 6 is a plan view, and Fig. 7 an elevation, illustrating a modified construction.

In the drawings, and referring first to Figs. 1–5, A represents supports or pedestals to which is rigidly secured a member B which serves as a measuring bar and as a guideway for a carriage M on which is mounted one of the belt supports, as hereinafter described. As shown best in Fig. 5, the bar B is in the form of a channel bar having its base uppermost. Preferably, as shown, the supports A are extended to support a shelf or workbench formed of planks C arranged above the level of the measuring bar B. At one end of the apparatus a bracket D is secured to the measuring bar B and also to the planks C. The bracket D has attached to it a belt support E. The support E bears a general resemblance to a belt pulley, and comprises a disk-like body connected to the bracket D at E'. At the periphery of the disk-like body a rim $E^2$ is provided which is, in general, like the rim of an ordinary pulley, except that it, as well as the adjacent portion of the body of the support E, is cut away at $E^3$ to receive the table G hereinafter described. At the same end of the apparatus at which the belt support E is provided, a bracket F, secured to the measuring bar B, and also by preference to the planking C, is provided. The bracket F carries a table G which, as shown in Fig. 2, has its upper surface somewhat below the upper surface of the support E, and extending into the cut-away portion of the latter. On the table G is mounted the apparatus for putting the belts to be measured under regulated tension. This apparatus includes a belt clamp L, a support H, and the connections between them. The support H may be secured It is also true with the apparatus shown in Fig. 1, that when the mold support is lifted preparatory to collision that the anvil will also move upward to some extent with a consequent decrease in the tension of the springs C. In consequence of these characteristics, the pressure on the base A of the springs C will vary between a minimum at the instant at which collision begins, and a maximum at the instant at which the anvil is thereafter moved into its position of closest proximity to the body of the base A, but the changes in tension of the springs thus produced are gradual, and the maximum tension of the springs will be in practice only a small fraction of the pressure which the mold support would exert against the base during collision if the base and anvil were rigidly connected together. In consequence none of the shock of collision, properly speaking, is transmitted to the base A, and by it to the foundation, although, as I have pointed out, there will be a variation, so to speak, in the static pressure or effective weight imposed on the foundation.

It will be observed that the mechanism disclosed is characterized by its extreme simplicity in construction and arrangement. Moreover, the structure, as a whole, is self-contained and, in operation, the base remains quiescent on and in fixed relation to the foundation.

In order to check the upward movement of the anvil relative to the base when the mold support is lifted off the anvil, the anvil and base may be connected together in such manner as to check the rising movement of the anvil while permitting the anvil all desirable freedom of movement toward the base after impact. One arrangement for thus checking the upward movement of the anvil is illustrated in Figs. 2 and 3, where a plurality of dash pots F each have their casing members connected to the base and their piston members connected to the anvil. In the construction specifically illustrated, a yoke $F'$ is connected to the lower end of the casing of each dash pot. The yoke is connected to the anvil by a bolt $F^2$. The upper end $F^3$ of the piston rod is threaded to permit it to be adjustably secured to the anvil. The piston $F^4$ is provided with through ports $F^5$ controlled by check valves $F^6$ which open on the downward movement of the piston in the casing and close on the upward movement. One or more elongated grooves $F^7$ are provided in the inner wall of the casing extending nearly the length of the latter. These grooves decrease in cross-section from about the middle of the casing toward the upper end. A plurality of other vertically elongated ports $F^8$ may be formed in the lower end of the piston chamber. The chamber is preferably filled with some liquid such as oil, $F^9$ indicating a valved filling connection.

The operation of the dash pots will be readily understood. The rising movement of the anvil as it approaches the upward limit of its movement will be retarded and finally checked by the cushion formed by fluid trapped in the upper end of the piston chamber while the downward movement of the piston may take place freely owing to the provision of the ports $F^5$. Moreover, the ports $F^7$ and $F^8$ permit the anvil to have substantial freedom of movement in either direction in the lower portion of its range of movement.

The provision of the dash pot connections between the anvil and base as described, while not essential to the use of the apparatus described in Fig. 1, possesses certain advantages. The elevation of the anvil, which occurs when the mold support is raised preparatory to collision, decreases the effectiveness of collision to some extent, and the use of the dash pot connections by restricting this movement economizes the power required for the operation of the machine. Moreover, the dash pots, by retarding the upward movement of the anvil, maintain the springs under a higher minimum tension than would otherwise be the case, and thus permit of a more uniform length of effective stroke of the mold support with varying loads, and in consequence reduces the clearance space in the cylinder space $D^2$, necessary to avoid liability of injury to the mold support by its direct engagement with the upper end of the piston guide $A'$.

Dash pots FA, similar to the dash pots F, may also be connected between the mold support and the anvil, as shown in Fig. 2, for the purpose of limiting the movement of the mold support away from the anvil, thus avoiding all liability of blowing the mold support off the guide post $A'$. This permits of the use of a simpler valve controlling the admission of air to the cylinder space $D^2$ than would otherwise be possible. No claim is made herein however to the use of dash pot connections to the mold support except in connection with the features of construction peculiar to the molding machine described herein as such connections to the mold support of a machine of this general type were invented by Frederick W. Taylor, and are described and claimed in his application Ser. No. 530,289 filed November 29 1909.

Having now described my invention, what I claim as new and desire to secure by Letters Patent is,

1. In a jar molding machine, a base member provided with a piston guide, a vertically movable anvil mounted on said guide, means providing a resilient cushion between surface, and the other Q on the top surface, of the member B. The carriage M is provided with two index devices P, P'. The index P, in conjunction with the scale indications Q, formed on the top surface of the member B, may show directly the length of a short belt stretched between the support H and the arm O, while the other index P' may coöperate with the scale indications Q' formed on the front edge of the member B to give a direct reading of the length of a belt stretched over the pulley-like supports N and E.

In Figs. 6 and 7 I have illustrated a fluid pressure mechanism for putting belts to be measured under a regulated tension and for measuring the tension. This arrangement I consider preferable in many cases to that employed in the construction shown by Figs. 1, 2, 2ª and 3. In Figs. 6 and 7, the clamps HA and LA which may be generally like the clamps H and L of the construction first described, and be used in the same way, are connected to cross-heads S' and R, respectively, by bolts or rods S² and R². The cross-head S' has secured to it a trunk piston S³ which enters a cylinder R' secured to the crosshead R. Fluid under pressure, as compressed air, is admitted to and exhausted from a cylinder R' in any suitable manner as through a pipe T and three-way valve T'. W represents a pressure gage for measuring the pressure in the cylinder R', and preferably this gage has its scale so arranged that it shows directly the pounds tension to which the belt being stretched is subjected. I prefer to attach to some part of the mechanism, as for instance to the crosshead S', a pneumatic vibrator U, such as is shown by the Tabor Patent No. 533,401, and is in common use in connection with molding machinery. This device may be supplied through the pipe U' and valve U² with pressure fluid from the same source as that admitted to the cylinder R'. The vibration in the crosshead and parts attached to it caused by the rapidly re-occurring blows of the device U, prevents any ordinary frictional resistance to the movement of the clamp LA relative to the clamp HA from interfering with the proper operation of the apparatus, and thereby renders it certain that the belt tension will correspond exactly to the fluid pressure in the cylinder R'.

Any suitable source of fluid under pressure may be employed to compress air in sufficient volume, and to a proper tension for operating the piston and cylinder belt-stretching device and the vibrator.

While in accordance with the provisions of the statutes, I have herein illustrated and described the best forms of my invention now known to me, it will be apparent to those skilled in the art that changes may be made in the form of the apparatus disclosed without departing from the spirit of my invention.

Having now described my invention, what I claim as new, and desire to secure by Letters Patent, is:

1. A device for measuring belts under tension, comprising a structure provided with a carriage guide, a carriage running along said guide, means for locking it to said structure in different positions along said guide, a belt support carried by said carriage, a second belt support secured to said structure, means for putting a belt extending between said belt supports under a varying tension, and means for measuring said tension.

2. A device for measuring belts under tension, comprising a measuring bar, a belt support secured thereto, a carriage mounted on said bar, means for securing said carriage to said bar at different positions along the length of the latter, a belt support mounted on said carriage, means for putting a belt extending between the said two supports under varying tension, and means for measuring said tension.

3. In a device for measuring belts under tension, the combination of a structure provided with a carriage guide, a carriage running along said guide, means for locking said carriage to said structure in different positions along said guide, a belt support carried by said carriage about which a doubled belt may be looped, and a second belt support carried by the carriage to which one end of a belt may be secured.

4. In a device for measuring a belt under tension, the combination of an elongated carriage guide, a carriage movable along said guide, means for locking it in fixed relation to said guide at different positions along the length of the guide, a pulley like support for a doubled belt carried by said support, an arm carrying a belt clamp pivoted to said carriage to move relative thereto into and out of the position in which the arm engages the periphery of said pulley like belt support.

5. In a device for measuring a belt under tension, a measuring bar, a carriage movable along said bar, a hollow support for a belt pulley, said support projecting from one side of said carriage, and means for clamping said carriage to said bar in different positions along the length of the bar, comprising a shaft extending through said hollow support, and a hand wheel on the end of the shaft.

6. In apparatus for measuring belts under tension, the combination of a structure provided with a carriage guide, a carriage movable along said guide, means for locking said carriage to said structure in different positions along said guide, a pair of belt supports about which a belt may be passed, one belt support being secured to said structure and the other to said carriage, a belt clamp on said carriage, and coöperating means for putting a belt under tension, comprising a movable clamp for one end of the belt and means including an adjustable tension regulating device for connecting said movable clamp to the other end of the belt when the latter is looped about said belt supports and to said structure when the other end of the belt is secured to the belt clamp on the carriage.

7. In apparatus for measuring belts under tension, the combination of a structure provided with a carriage guide, a carriage movable along said guide, means for locking said carriage to said structure in different positions along said guide, a pair of belt supports about which a belt may be passed, one belt support being secured to said structure and the other to said carriage, a belt clamp on said carriage, and coöperating means for putting a belt under tension, comprising a movable clamp for one end of the belt and means including an adjustable tension regulating device for connecting said movable clamp to the other end of the belt when the latter is looped about said belt supports and to said structure when the other end of the belt is secured to the belt clamp on the carriage, said guide being provided with two sets of scale indications for indicating the lengths of the belts under tension with the various adjustments of the said carriage, one set for use when the ends of the belts are held by the said two belt clamps and the other set when the belts are looped about said belt supports.

8. In apparatus for measuring belts under tension, the combination of a structure provided with a carriage guide, a carriage movable along said guide, means for locking said carriage to said structure in different positions along said guide, a pair of belt supports about which a belt may be passed, one belt support being secured to said structure and the other to said carriage, a belt clamp on said carriage, coöperating means for putting a belt under tension, comprising a movable clamp for one end of the belt and means including an adjustable tension regulating device for connecting said movable clamp to the other end of the belt when the latter is looped about said belt supports and to said structure when the other end of the belt is secured to the belt clamp on the carriage, and a table secured to said structure and on which said movable belt clamp is mounted.

9. In apparatus for measuring belts under tension, the combination of a structure provided with a carriage-guide, a carriage movable along said guide, means for locking said carriage to said structure in different positions along said guide, a pair of belt supports about which a belt may be passed, one belt support being secured to said structure and the other to said carriage, a belt clamp on said carriage, and coöperating means for putting a belt under tension, comprising a movable clamp for one end of the belt, a third clamp adapted to be secured to the other end of the belt in the case of relatively long belts looped about said supports, means for securing said third clamp to said structure in the case of relatively short belts stretched between said movable clamp and the clamp carried by said carriage, and adjustable tension regulating connections between said movable and third clamps.

10. A device for measuring belts under tension, comprising a measuring bar, a pair of belt clamps mounted on the measuring bar, and fluid pressure means for adjusting the clamps relative to each other, comprising a piston member connected to one of the clamps, a coöperating cylinder member connected to the other clamp, means for supplying a pressure fluid under regulated pressure, to the cylinder, and a fluid pressure vibrating device connected to one of said members.

WILFRED LEWIS.

Witnesses:
ARNOLD KATZ,
D. STEWART.